(12) United States Patent
Zhang et al.

(10) Patent No.: US 11,196,697 B1
(45) Date of Patent: *Dec. 7, 2021

(54) ACCESS CONTROLS FOR UNITS OF CONTENT IN A MESSAGING SERVICE

(71) Applicant: Facebook, Inc., Menlo Park, CA (US)

(72) Inventors: Edward Young Zhang, San Francisco, CA (US); Weiwei Ding, Fremont, CA (US); Qian Wang, Fremont, CA (US); Ming Xiao, Mountain View, CA (US); Guangyuan Liu, Union City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/552,091

(22) Filed: Aug. 27, 2019

Related U.S. Application Data

(63) Continuation of application No. 15/391,172, filed on Dec. 27, 2016, now Pat. No. 10,439,977.

(51) Int. Cl.
*H04L 12/58* (2006.01)
*H04L 29/08* (2006.01)
*H04L 29/06* (2006.01)

(52) U.S. Cl.
CPC .............. *H04L 51/32* (2013.01); *H04L 51/12* (2013.01); *H04L 67/02* (2013.01); *H04L 67/20* (2013.01); *H04L 67/2833* (2013.01); *H04L 67/306* (2013.01); *H04L 67/42* (2013.01); *H04L 51/38* (2013.01)

(58) Field of Classification Search
CPC .......... H04L 51/12–51/32; H04L 67/02–67/42
See application file for complete search history.

(56) References Cited

U.S. PATENT DOCUMENTS

| 8,825,759 B1* | 9/2014 | Jackson | H04L 67/02 709/204 |
|---|---|---|---|
| 9,866,628 B1* | 1/2018 | Lewis | H04N 21/252 |
| 2005/0149622 A1 | 7/2005 | Kirkland et al. | |
| 2009/0210391 A1 | 8/2009 | Hall et al. | |

(Continued)

OTHER PUBLICATIONS

Pollitt, "How to Attract over 50k Subscribers in 6 months", Jun. 17, 2015, contentmarketinginstitute.com, 17 pages.

*Primary Examiner* — Clayton R Williams
(74) *Attorney, Agent, or Firm* — Kacvinsky Daisak Bluni PLLC

(57) ABSTRACT

Exemplary embodiments provide techniques for promoting and providing subscribed content via a messaging platform. An article may be viewed via a social networking service (such as in a social network's news feed), or on a partner website integrated with the social networking service and/or messaging service. When opening the article (e.g., in a web-based view), a banner may be displayed in association with the article indicating that the article could have been received as part of a messaging-based subscription service. The banner may include a control to subscribe to the publisher with the messaging service. Topics related to an article may be suggested in the message thread for the subscription, with the selection of a topic retrieving additional articles from that publisher related to that topic. These additional articles may be selected using social networking topic determination.

17 Claims, 19 Drawing Sheets

(56) References Cited

U.S. PATENT DOCUMENTS

2010/0064040 A1\* 3/2010 Wise ................... G06Q 30/02
709/224
2014/0013246 A1 1/2014 Beechuk et al.
2016/0014060 A1\* 1/2016 Vasudevan ............. H04L 51/14
709/206

\* cited by examiner

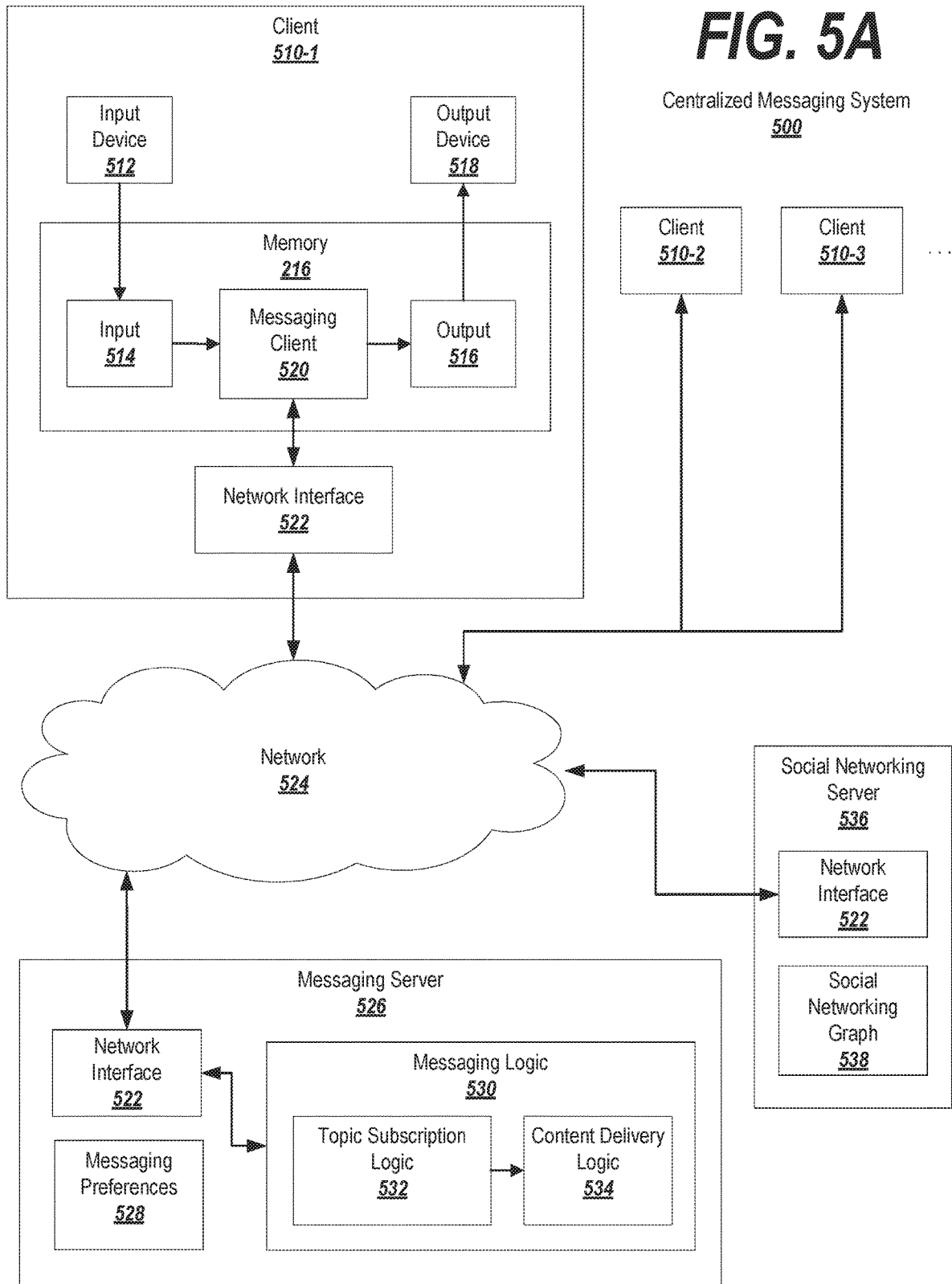

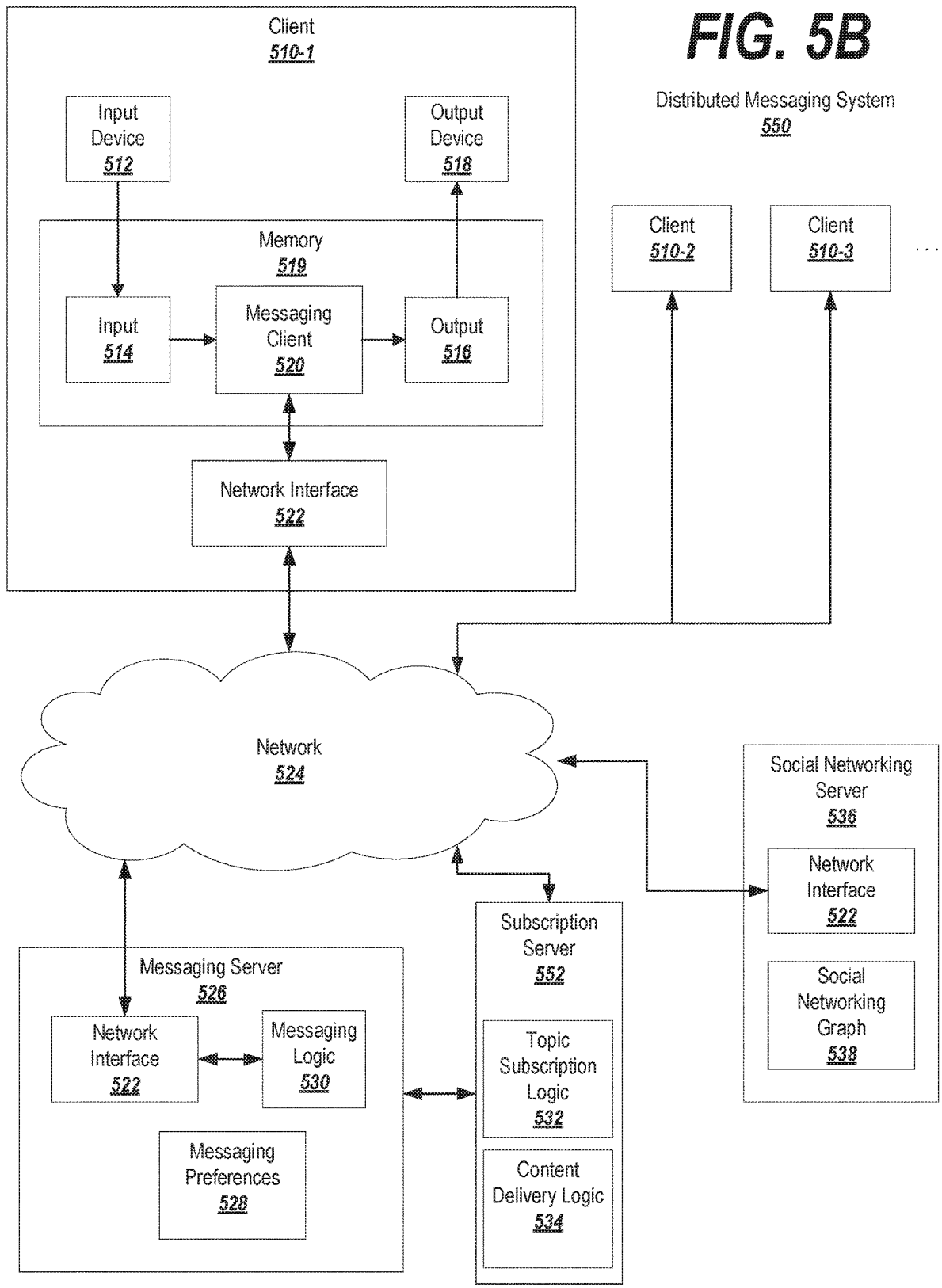

US 11,196,697 B1

ACCESS CONTROLS FOR UNITS OF CONTENT IN A MESSAGING SERVICE

RELATED APPLICATIONS

This application is a continuation of, claims the benefit of and priority to previously filed U.S. patent application Ser. No. 15/391,172 filed Dec. 27, 2019 entitled "ACCESS CONTROLS FOR UNITS OF CONTENT IN A MESSAGING SERVICE", which is hereby incorporated by reference in its entirety.

BACKGROUND

Messaging services allow users to exchange messages with other users or entities. In some cases, users may receive content, such as a news article, through a messaging service. When content is provided through a messaging service, the content is usually shared individually, from one user to another. Such content sharing is often reactive (e.g., a user enjoys an article and reacts by sharing the article with a friend). Content providers may wish to provide their content to users in a proactive manner, such as by sending a link to their content to users of a messaging service. However, it may be difficult for content providers to locate interested messaging users and secure permission from the users to provide messages. Moreover, in such a scenario, content providers must be especially careful to identify and send only content in which the users are interested; otherwise, the users may treat messages from the content providers as spam and may be more likely to revoke their permission to receive content through messages. This places a burden on the content providers, particularly high-volume content providers such as news organizations.

BRIEF DESCRIPTION OF THE DRAWINGS

FIG. 5A is a block diagram providing an overview of a system including an exemplary centralized communications service;

FIG. 5B is a block diagram providing an overview of a system including an exemplary distributed communications service;

DETAILED DESCRIPTION

Figure 1A:
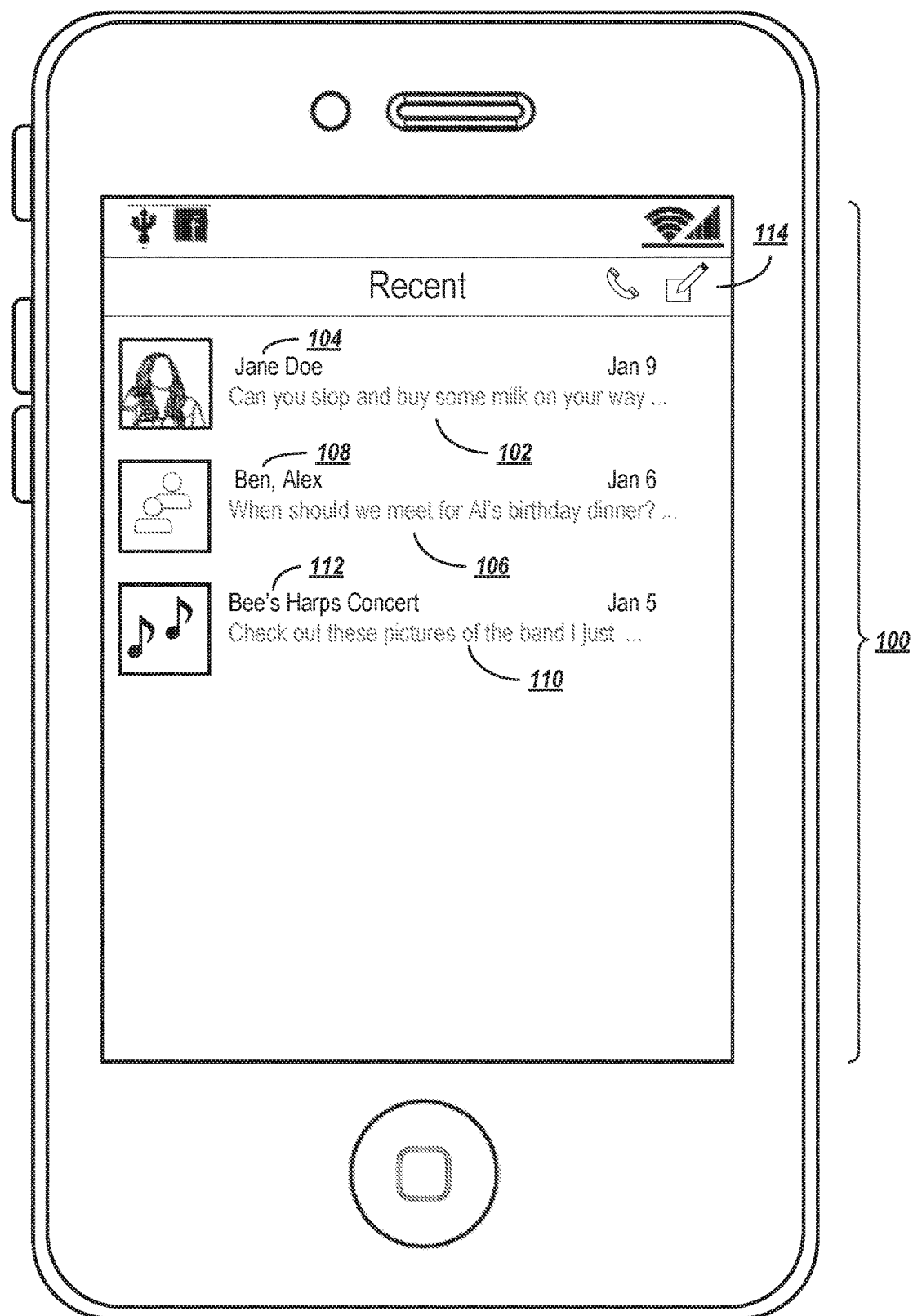
FIG. 1A depicts an exemplary messaging interface including several types of individual and group messages.

Exemplary embodiments provide techniques for promoting and providing subscribed content via a messaging platform. Users may subscribe with a messaging service to receive content, such as news articles, sports scores, weather reports, etc.

Users may subscribe to receive content-based messages in a number of ways. For example, a user may access content via a social networking service (such as in a social network's news feed), or on a partner website integrated with the social networking service and/or messaging service. When opening the content (e.g., in a web-based view in a social network or through a content provider's delivery system such as on a provider web page or through a provider app), a related-content control option may be provided. The option may include a control to subscribe to the publisher with the messaging service. For example, a banner may be displayed in association with the article indicating that the article, or other articles like it, could have been received as part of a messaging-based subscription service.

Upon interacting with the control, the messaging service may be instructed to create or update a subscription for the user. The subscription may be associated with the provider of the content and/or one or more topics. The topics may be derived from the original content with which the user interacted, such as by using a natural language processor to perform a natural language analysis on the content to extract one or more topics from the content. The messaging service may also consult a social networking service to determine topics that may be of interest to a user, and/or may request a list of topics from the content provider (e.g., topics that the content provider associated with the original content, or a list of topics the content provider typically writes about). In some cases, content providers may be hesitant or unable to flag their content with topics; exemplary embodiments may advantageously suggest topics to a user and identify the topics of future content without input or direction from the content provider.

After identifying potential topics of interest to the user, the messaging system may generate a welcome message for the content provider, and may transmit the welcome message to the user. The welcome message may include a list of the identified topics, and the user may select none, some, or all of the topics to receive future content related to the topics.

The content provider may generate new content that the content provider wishes to provide to users of the messaging service. The content provider may provide the content or an access control (e.g., a link) for the content to the messaging service. For example, the content provider may call an application program interface (API) associated with the messaging service to provide the new content or the access control. If available, the content provider may optionally identify one or more topics associated with the content.

Upon receiving the new content or the access control (e.g., via the API call), the messaging service may access a copy of the content (e.g., directly, if the content was provided as part of the API call, or indirectly, using the access control). The messaging service may direct a natural language processor to perform a natural language analysis on the content to identify one or more topics associated with the content.

Based on the topics associated with the new content, the messaging service may search a directory or list of subscriptions for users that are subscribed to the content provider and/or the topics of the new content. Having identified one or more users to receive the content, the messaging service may transmit the content to the identified users.

In some implementations, articles for a subscription may be aggregated or queued, and received by users of the messaging service in a daily digest. Various display techniques, such as a horizontal scroll, may be used to arrange the daily digest.

If a user receiving the new content accesses the content (e.g., by following a link of the access control to a copy of the content), the messaging service may be notified that the user has accessed the new content. The messaging service may use the topics associated with the new content (e.g., the topics extracted from the new content through natural language analysis) to generate a topic update message for the user. The topic update message may identify additional topics to which the user may be interested in subscribing. The user may interact with the topic update message to designate additional topics of interest. Based on the additional topics of interest, the messaging service may update the user's subscription.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous and/or asynchronous video conversation in a messaging system is next provided Exemplary Interfaces As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Users may interact with a messaging system through a client application. FIG. 1A depicts an example of a client application displaying a messaging interface 100. The messaging interface 100 of FIG. 1A shows an exemplary summary screen that provides an overview of messages recently sent to (or by) the user of the client application.

Messaging systems may support a variety of different types of messages. For example, the messaging interface 100 includes a summary of a one-to-one (or individual) message 102. A one-to-one message is a message exchanged between two entities, so that only the two entities can see and participate in the conversation. For example, in the one-to-one message 102, the current user (Jack Doe) recently received a message from his wife, Jane Doe. The other participant in the conversation is indicated in the interface 100 using an identifier 104 (including a name and profile picture, in this example). Only Jack and Jane participate in the conversation, and only Jack and Jane can view the conversation.

Another message type supported by the messaging system is a group conversation. In a group conversation, multiple users see and participate in the conversation. FIG. 1A depicts an exemplary summary of a group conversation 106. In the summary of the group conversation 106, each of the other users participating in the conversation is indicated by respective identifiers 108. In this case, the identifiers include the names or handles of the other users participating in the group conversation, and an icon to indicate that the conversation is a group conversation. For example, in this case the current user (Jack) is participating in a conversation with his friends Ben and Alex. Jack, Ben, and Alex can each see all of the messages in the conversation (regardless of who sent the message) and can send messages to the group.

Another type of message supported by the messaging system is a message between one or more users and an organization (such as a business) or event. For example, FIG. 1A shows an event message 110 sent by the current user (Jack) to the page of an event being organized through a social network. The identifier 112 identifies the name of the event, and an icon is presented identifying this particular event is a concert. In an event message 110, all participants in the event (as a participant is defined, e.g., by the event's social networking page) can view and send event messages 110. Participants may include, for example, people attending the event, fans of the event that have signed up with the event's page to receive messages about the event, event organizers, etc.

By selecting an existing message summary 102, 106, 110, the user can view messages in an existing conversation and add new messages to the conversation. Moreover, the interface 100 includes interface elements 114 allowing the user to create a new message.

Figure 1B:
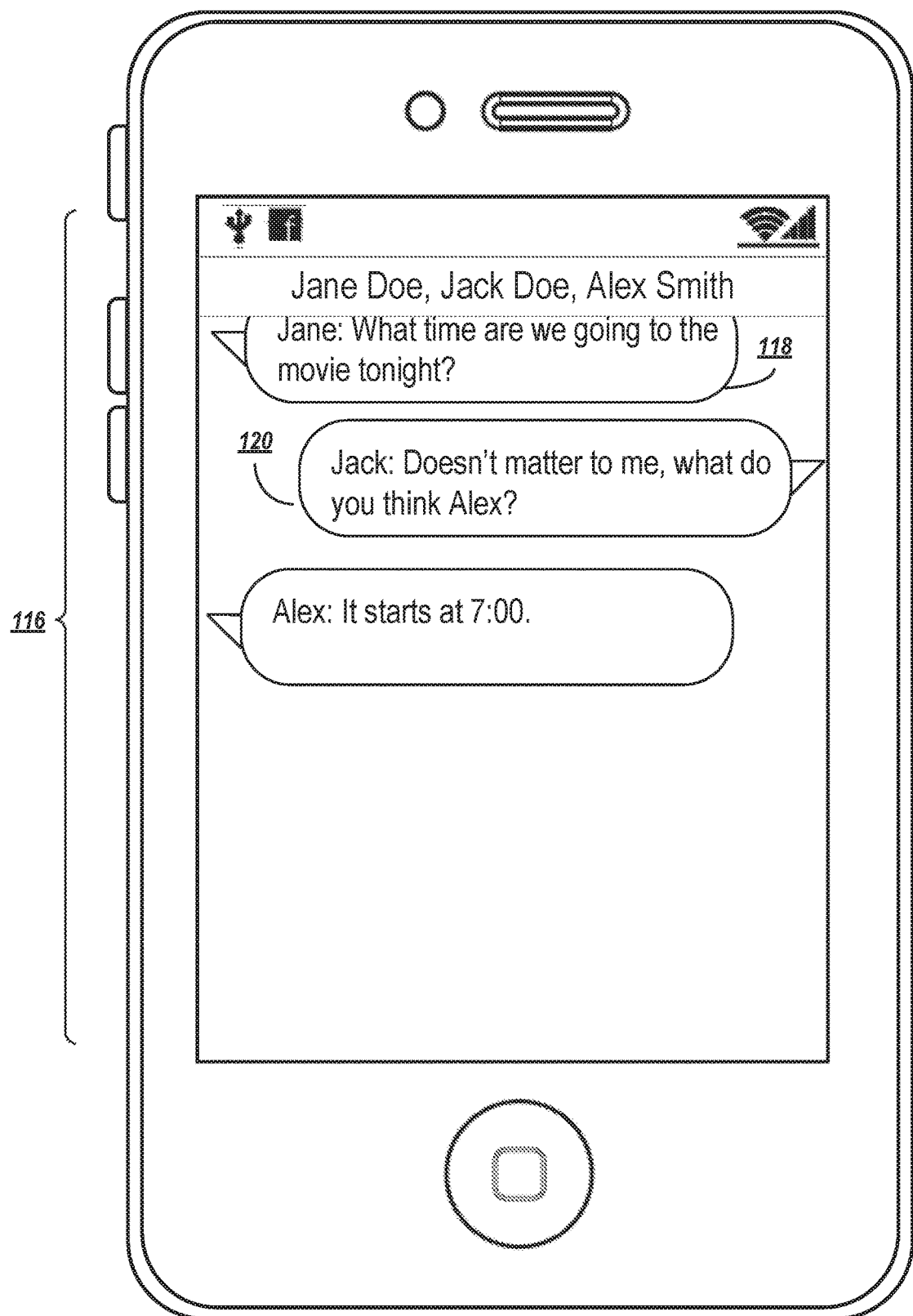
FIG. 1B depicts a view of a conversation in a messaging service.

FIG. 1B depicts an example of an interface 116 displayed on a client mobile device. In this example, a group conversation is occurring between Jane Doe, Jack Doe, and Alex Smith. Jane Doe, as viewed from the client device of Jack Doe. In this case, Jane Doe transmitted a first message 118 asking "what time are we going to the movie tonight?" Jack Doe followed up with a second message 120 stating "doesn't matter to me, what do you think Alex?" The group may continue to exchange messages, which may appear in the interface 116.

According to exemplary embodiments, the messaging system may manage content subscriptions and provide content to users through messages. FIGS. 2A-2G depict examples of subscription and content management for a messaging system.

Figure 2A:
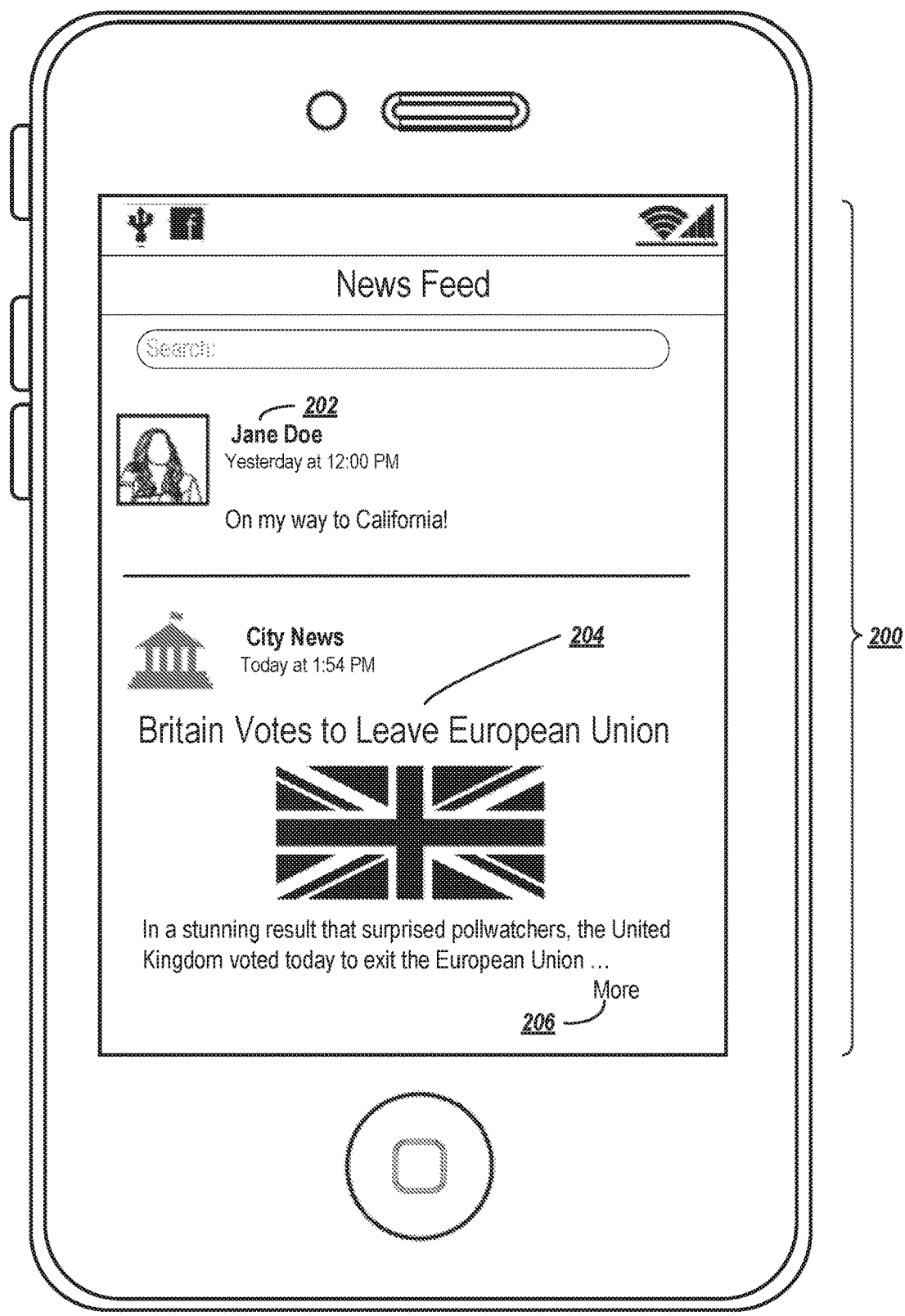
FIG. 2A depicts a view of a news feed in a social networking service.

FIG. 2A depicts an interface 200 associated with a news feed of a social networking service. The social networking service may be associated with the messaging service. For example, users having accounts on the social networking service may have corresponding accounts in the messaging service. The corresponding accounts may be linked so that users may engage with each other through the social networking service and/or the messaging service in a unified experience, and may move seamlessly between the messaging service and the social networking service.

The interface 200 includes a post 202 from a user. The interface 200 also includes a content item 204 (in this case, a news article from the content provider "City News"). The view of the content item presented in the news feed interface 200 may be a summary view, with a control 206 or other interactable element that allows the entirety of the content to be viewed.

Figure 2B:
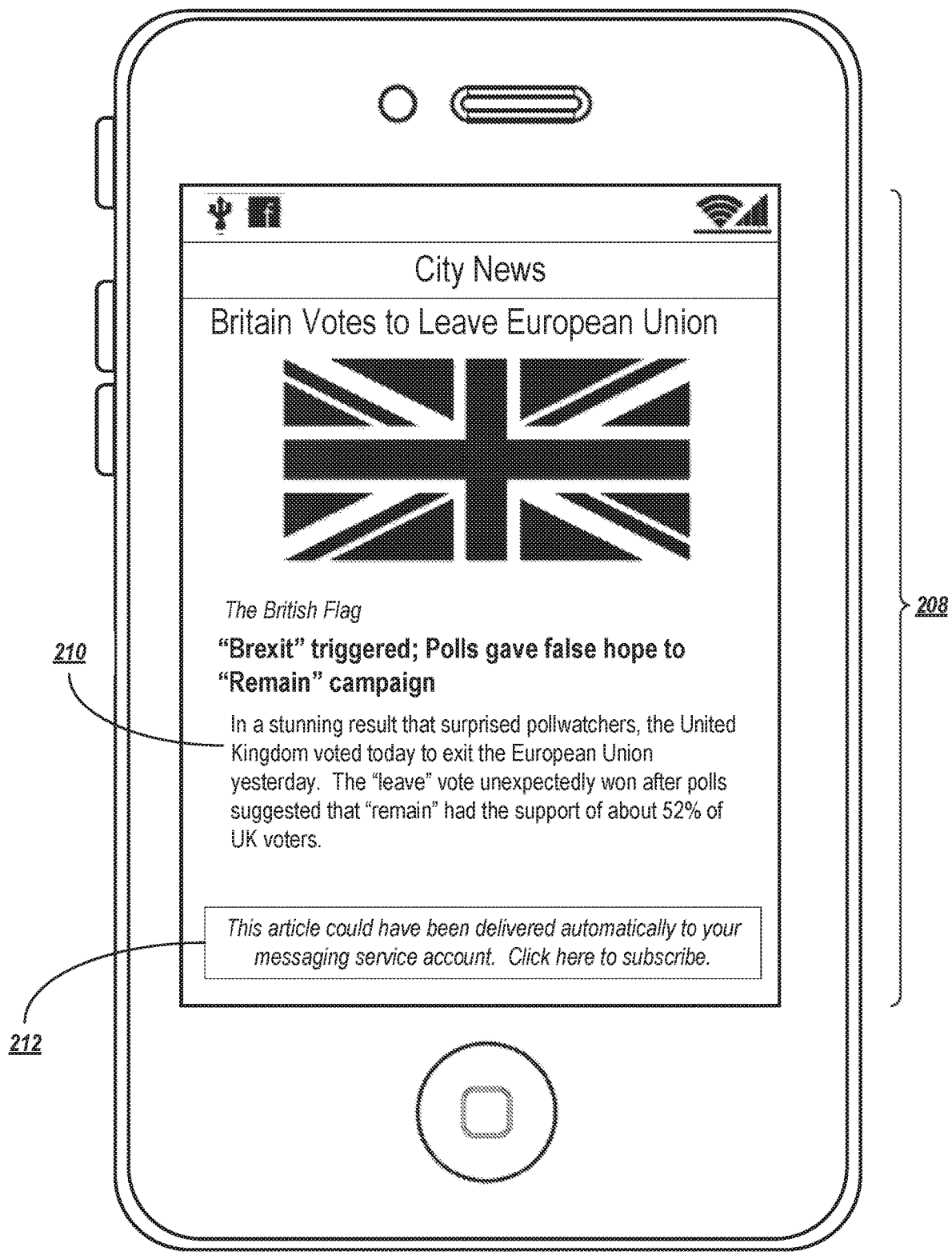
FIG. 2B depicts a view of an article selected from the news feed of FIG. 2A.

Interacting with the control 206 may launch a web-based viewer that loads the content, such as the web-based interface 208 of FIG. 2B. The interface 208 may display the substance 210 of the content, such as text or graphics for an article, scores for a sports game, temperatures and conditions for a weather forecast, etc.

According to exemplary embodiments, a related-content control 212 (in this case, an interactable banner) may be appended to the substance 210 of the content. The related-content control 212 may indicate that the content and/or other similar content is eligible for delivery through a messaging service. Interacting with the related-content control 212 may cause the social networking service to communicate with an associated messaging service to cause the messaging service to create a subscription for the user related to the content and/or the content provider (or to modify an existing subscription).

Figure 2C:
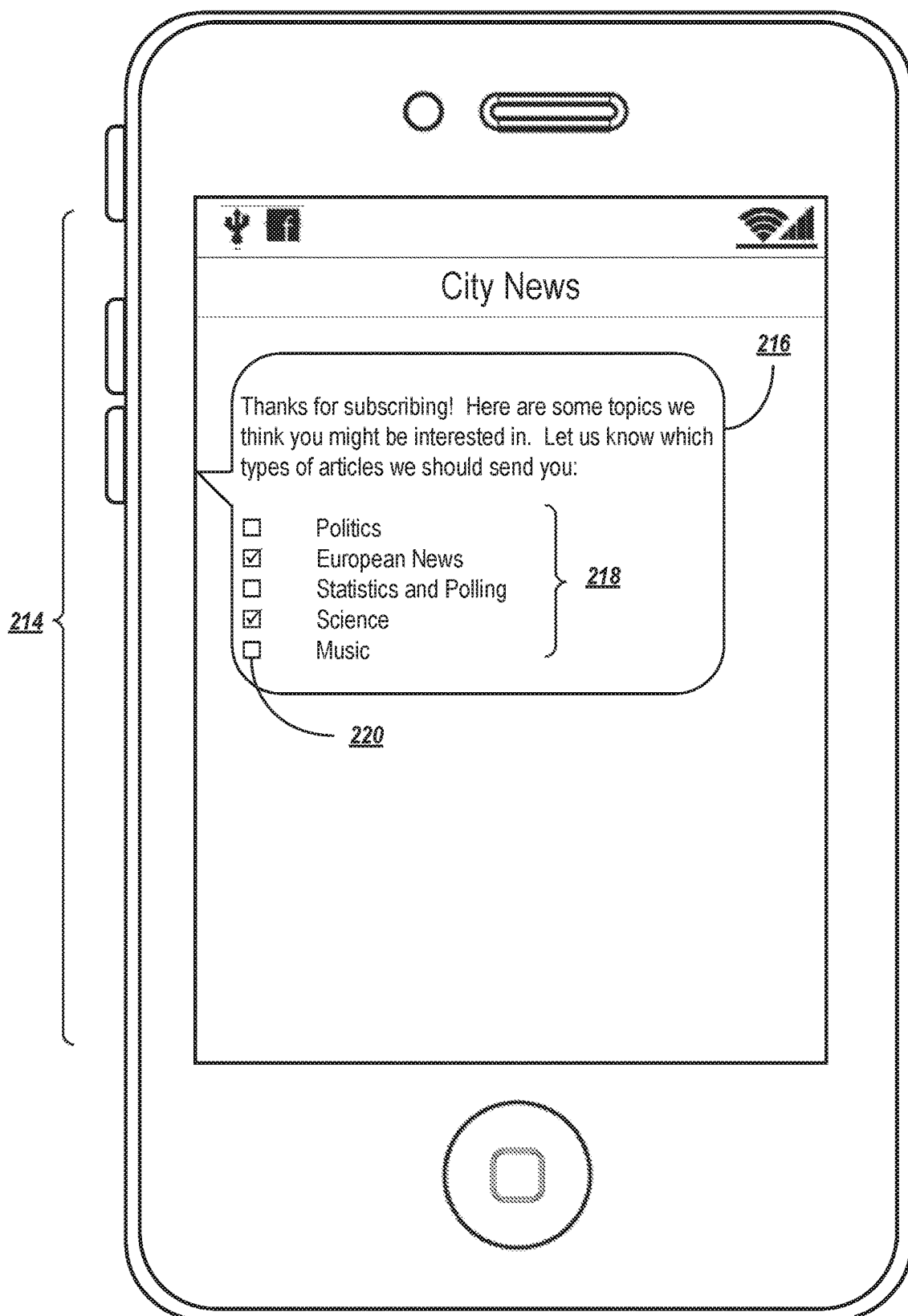
FIG. 2C depicts a view of a topic selection message in a messaging service received as a result of a subscription.

Upon creating or modifying the subscription, the messaging service may generate a welcome message relating to the content and/or the content provider, and may transmit the welcome message to the user. For example, FIG. 2C depicts an exemplary message thread interface 214 showing a conversation between the user and the content provider. If the user has not previously engaged with the content provider through the messaging service, a new thread having a new thread identifier may be generated and the welcome message 216 may be sent via the new thread. If the user has previously engaged with the content provider through the messaging service, the welcome message 216 may be associated with an existing thread identifier and may be displayed in an existing thread.

The welcome message 216 may include a list of topics 218 that were associated with the content, the content provider, or other user interests identified through the social network. In some embodiments, the messaging service or the social networking service may cross-check the topics identified through the user's social networking information to identify which topics that the user is interested in are correlated to topics that the content provider typically addresses. The messaging system may filter out any topics that the content provider does not address, and may provide a list of topics in which the user has an interest and for which the content provider is likely to generate content.

The welcome message 216 may provide interactable elements 220, such as check boxes or buttons, to allow the user to select one or more topics of interest. The selected topics may be added to the user's subscription so that the user may receive messages including content from the content provider relating to the selected topics in the future.

The embodiment depicted in FIG. 2C is intended to be exemplary only, and other techniques for indicating subscribable topics may also be provided. For example, a separate window may be provided at the bottom of the message interface 214 in the thread associated with the content provider. The separate window may include a list of topics (which may be scrollable) that shows a list of subscribed topics and/or other topics for which the user may have an interest.

After the user identifies one or more topics of interest, the content provider may transmit content (or links to content) to the messaging service. The messaging service may identify which users have subscribed to the content provider, and may identify which topics the subscribing users are interested in. The messaging service may identify one or more topics of the new content (e.g., through natural language processing, or the content provider may identify the topics itself), and may retrieve the subset of users who subscribe to the content provider and who are interested in the topics associated with the new content.

Figure 2D:
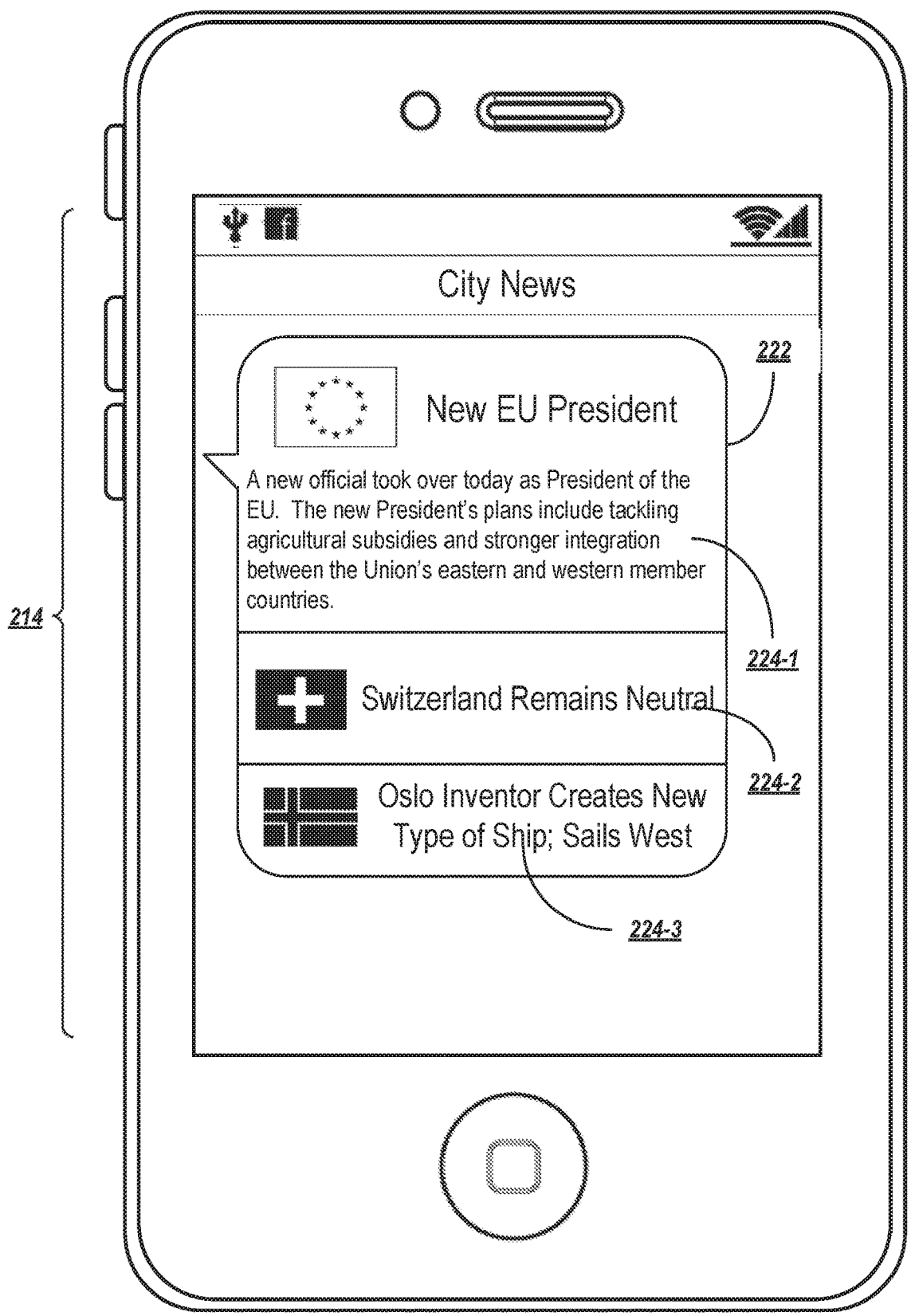
FIG. 2D depicts a view of a message including news content received as a result of a subscription.

The messaging service may then generate a message 222 including the content or the access control for the content, and may transmit the message to the identified users, as shown in FIG. 2D. The message may include a headline, an optional summary of the content, and may be interactable so that, upon selecting the message, the user is linked to a copy of the content.

The messaging system may transmit multiple content items from the content provider to the subscriber on the thread created between the content provider and the subscriber. In the example depicted in FIG. 2D, a single message 222 includes three content items 224-1, 224-2, and 224-3. Alternatively or in addition, different content items may be provided in different messages. In some embodiments, the messaging system may hold new content items in a queue for the user until a certain number of content items have been received, or until a certain amount of time has elapsed (e.g., one day, one week, etc.), and may transmit the messages together in a single message or a digest. In yet another embodiment, the content provider may provide collections of content together (or disparate content, but at the same time, such as a scheduled time), and the messaging system may transmit the collection of content as s single message or digest.

Different content may be emphasized or linked differently in the message 222. For example, the content may be ranked or otherwise scored and a most-significant unit of content (e.g., the unit the user is likely to be most interested in, the unit that is most popular on a social network or news site, etc.) may receive special emphasis. In the example depicted in FIG. 2D, the first unit of content 224-1 is identified as the most significant content unit, and hence is displayed with a headline and a brief summary. Other content items 224-2, 224-3 are displayed only as headlines.

Figure 2E:
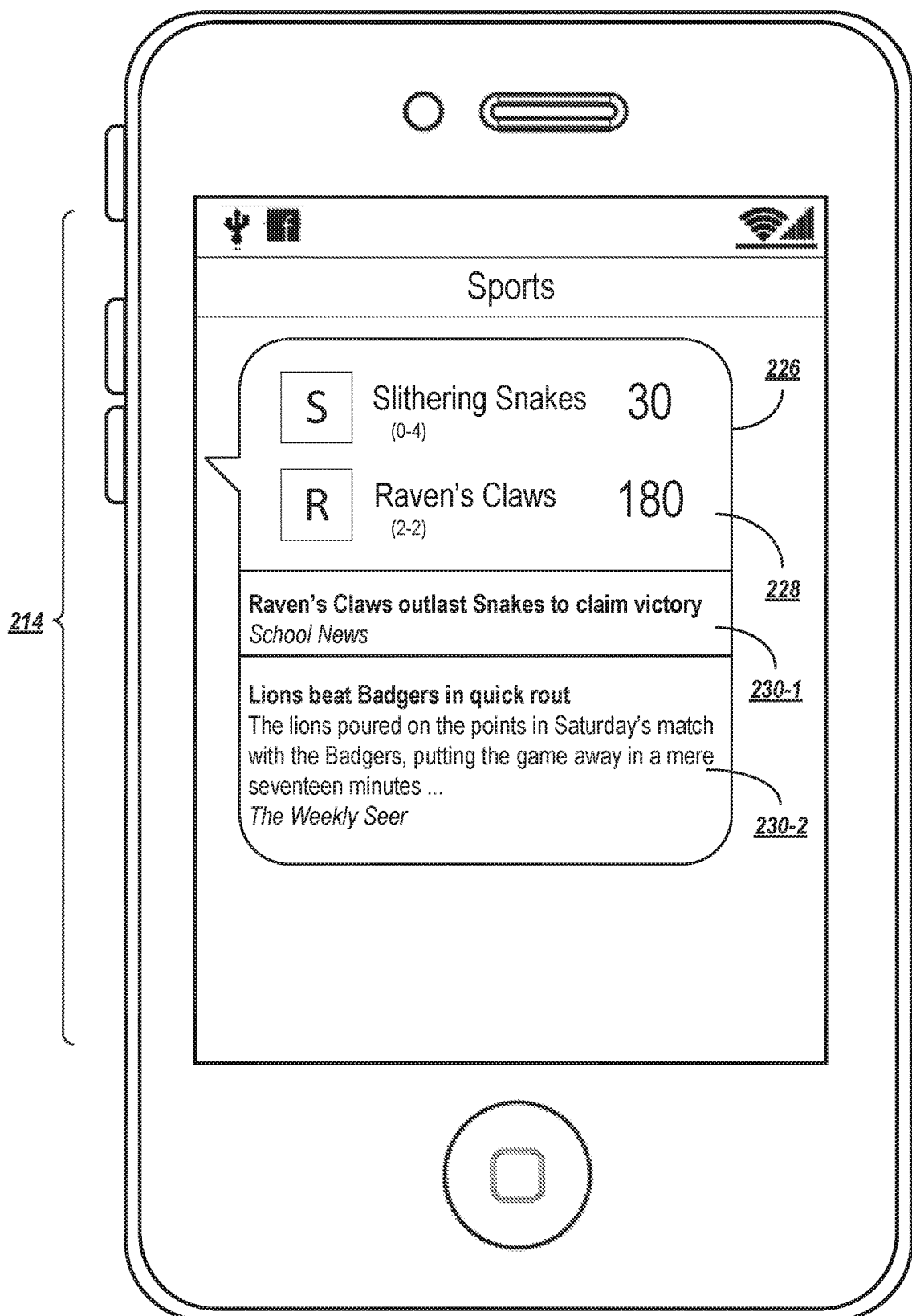
FIG. 2E depicts a view of a message including sports content received as a result of a subscription.

In some embodiments, content on the same topic may be aggregated among content providers and associated with its own topic-based thread having an associated thread identifier. FIG. 2E depicts an example of a thread for sports-related content. In this example, the social networking service may identify particular teams in which the user has an interest, and may cause the messaging service to subscribe specifically to sports-related content regarding those teams from subscribed content providers. A message 226 is generated including the content items 230-1, 230-2. One or more of the content items may be analyzed to extract information of particular significance and/or timeliness, which may be displayed in a specially designated or emphasized location, such as in a top portion 228 of the message 226 or in another prominent location. Examples of information of particular significance or timeliness may include, for example, sports scores, weather forecasts for today, breaking news, etc.

Figure 2F:
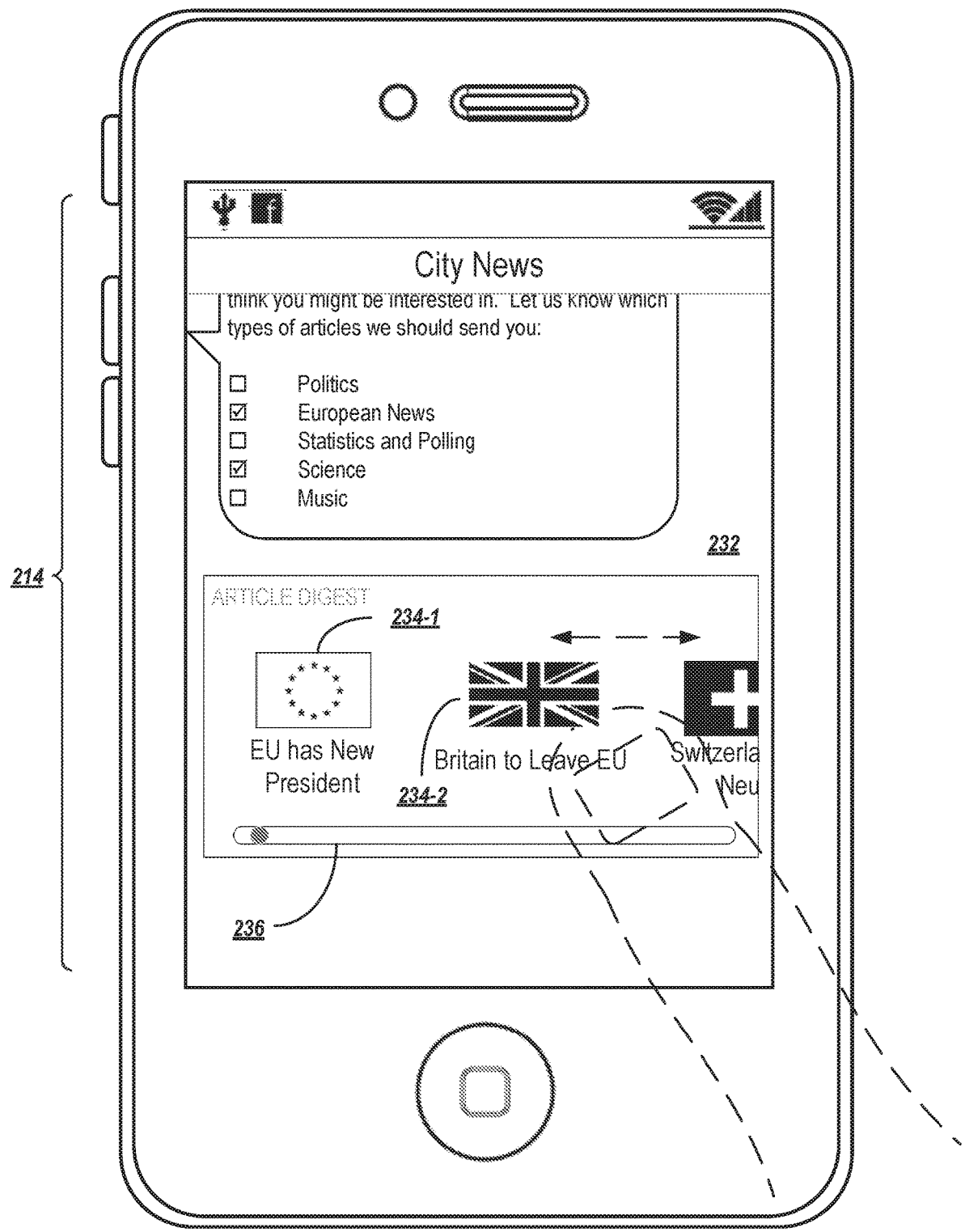
FIG. 2F depicts a view of a message including a digest received as a result of a subscription.

FIG. 2F depicts another example in which multiple units of content are aggregated together. In this example, the content is provided in a content digest 232. The content digest may be in the form of a message, or in the form of a designated region of the interface 214 for displaying units of content 234-1, 234-2, etc.

The content may be visually presented in a number of ways. For example, the article digest 232 may present a predetermined amount of content or options. If the messaging system determines that the amount of content can fit on the display of the user's device (e.g., based on the screen width and resolution available to the interface 214), then the content may be entirely displayed within the width of the interface, in a section reserved for the module 208.

The content digest 232 depicted in FIG. 2F, in contrast, utilizes a horizontal scroll. If the amount of content does not entirely fit on the display (or if the article digest 232 allows for a potentially unlimited or amount of content), then the system may provide options for allowing the user to scroll through the article digest 232. The system may present an option to scroll horizontally through the content (e.g., by allowing a user to gesture on a touch display with a left- or right-swipe), vertically through the content (e.g., by allowing a user to gesture on the touch display with an up- or down-swipe within an area reserved for the module), or both. In the depicted example, a horizontal scroll bar 236 shows the user's progress through the available content. In addition to scrolling through the interface 214 as a whole (e.g., in a vertical direction), the article digest 232 may be independently scrollable.

Figure 2G:
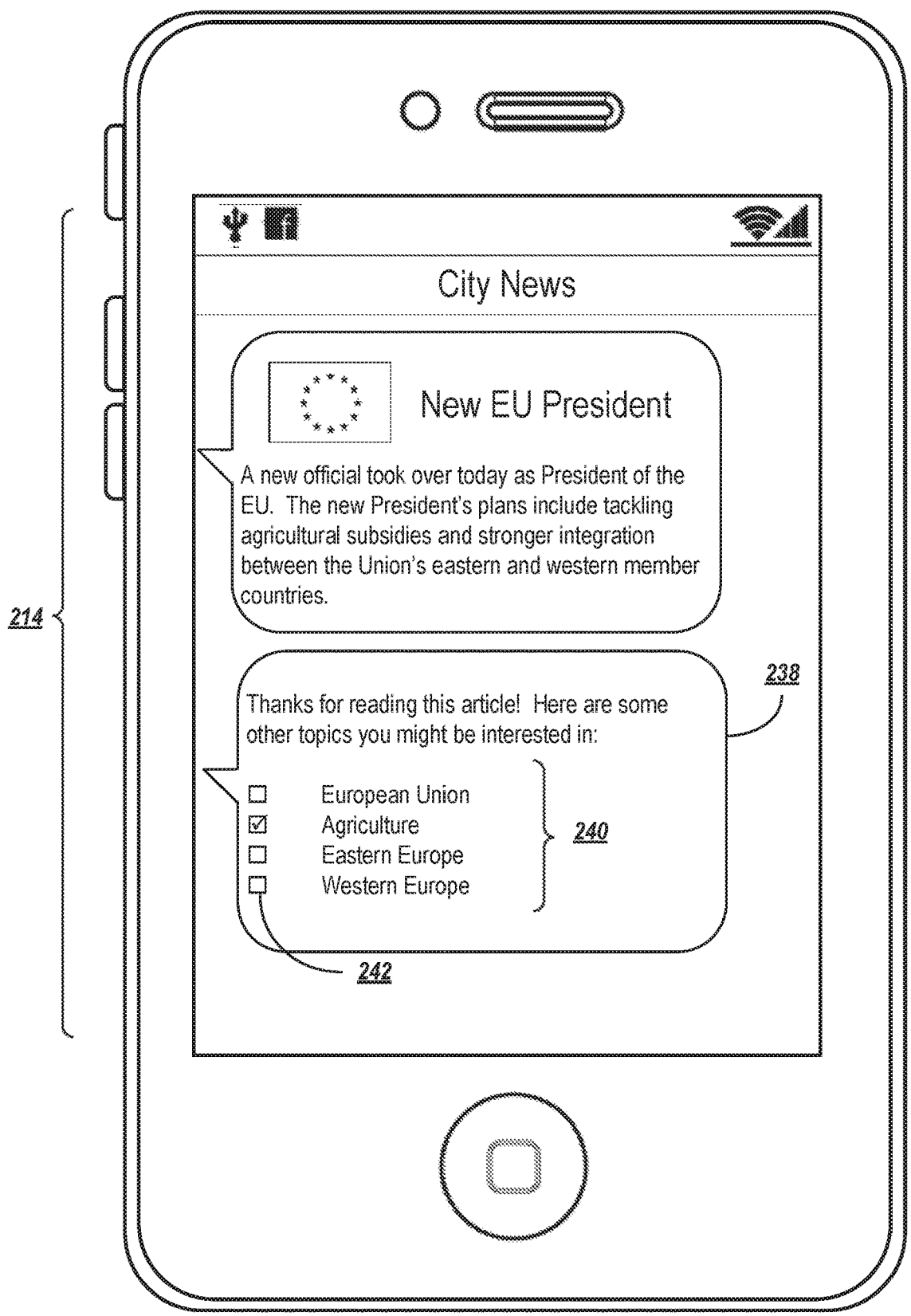
FIG. 2G depicts a view of an interface for selecting additional topics as a result of reading content received through a subscription.

When the user accesses one or more of the units of content, the messaging system may use this interaction as an opportunity to further refine the list of topics to which the user is subscribed. As noted above, the messaging system may have processed the incoming content in order to identify the topic(s) of the content, and to select users who are interested in at least one of those topics. If the user accesses the content, the messaging system may identify any topics of the content to which the user is not currently subscribed, and may present an option allowing the user to subscribe to those topics. For example, FIG. 2G depicts an example of a topic update message 238 having a new set of topics 240 based on a new article just viewed by the user. The user may subscribe to the new topics by interacting with elements 242 in the topic update message 238. If the user selects one or more new topics 240, the messaging service may update the user's subscription accordingly.

Next, exemplary techniques for managing topic subscriptions and delivering content are described.

Topic Subscription and Content Delivery Techniques

Figure 3:
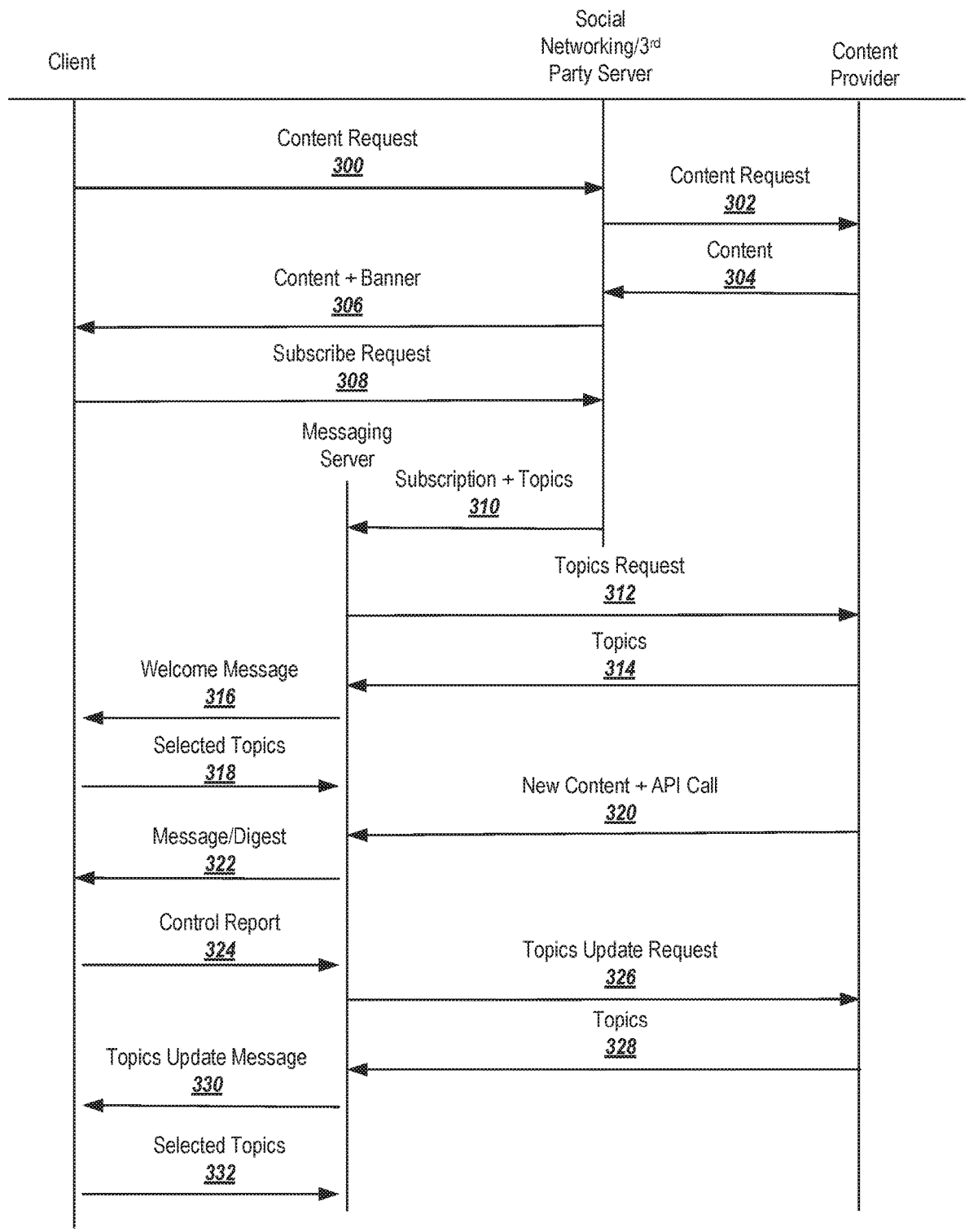
FIG. 3 is a data flow diagram depicting information exchange between various entities according to an exemplary embodiment.

FIG. 3 is a data flow diagram depicting an exemplary information exchange between a subscribing client device, a social networking (or third-party) server, a content provider, and a messaging server.

The client may transmit a content request 300 to the social networking or third-party server. The content request may include a request for content, such as a news article, weather forecast, etc. The client may generate the content request 300 by interacting with a newsfeed item on the social networking service, a web page link to the content, etc.

In response to receiving the content request 300, the social networking or third-party server may request the content from the content provider 302. The content provider may provide a copy of the content 304 to the social networking server or third-party server in response to the request 302.

If the third-party server has direct access to the content (e.g., the user is interacting with the content provider's own server), then the system may omit the sending of the content request 302 and the content 304.

Upon receiving the content 304, the social networking server or third-party server may append a subscription control, such as an interactable banner, to the content. The control may be configured so that, upon activation by the client, the client requests a subscription to the content provider. The social networking server or third-party server may transmit the content with the appended control 306 to the client.

If the user wishes to subscribe to the content provider, the user may interact with the control through the client to generate a subscription request 308, which is transmitted to the social networking server or third-party server. The social networking server or third party server may, in response to the request 308, transmit a subscription initiation message to a messaging server associated with a messaging service. The subscription initiation message may identify the user requesting the subscription, and may optionally include a list of topics in which the user has an interest, as identified by the social networking service. The subscription initiation message may further include a list of topics present in the original content 304, as identified (e.g.) by a natural language processor performing a natural language analysis on the content 304 (or the messaging server may perform the natural language processing on the content 304).

Alternatively, the subscription request 308 may be transmitted directly from the client to the messaging server.

In response to the subscription initiation message 310 (or the subscription request 308, if transmitted directly to the messaging server), the messaging server may create or modify a subscription for the user. Optionally, the messaging server may transmit a request for topics 312 to the content provider, to identify the topics that the content provider associated with the original content 304 and/or to identify topics generally addressed by the content provider. The content provider may respond to the request 312 with a list of topics 314.

The messaging server may cross-check the list of topics retrieved from the content provider and/or through natural language analysis of the content 304 against the interests of the user as reported by the social network. The messaging server may maintain a list of topics that overlap or are likely to overlap with interests of the user.

Based on the topics of interest to the user and/or the topics of the content and content provider, the messaging server may transmit a welcome message 316 to the client. The welcome message may include a list of topics to which the user may subscribe.

Upon selecting one or more of the topics for subscription, the client may transmit a list of selected topics 318 to the messaging server. Alternatively or in addition, the client may subscribe to the content provider without selecting specific topics, in order to receive all content provided by the content provider, the most popular content of the content provider, a provider-selected set of content, etc.

The messaging server may update the user's subscription using the list of selected topics 318.

The content provider may, at some point, generate new content and provide the new content to the messaging server. In one embodiment, the content provider may transmit a headline of the content, a summary of the content, and an access control for the content (e.g., a link to the full version of the content). The content provider may optionally tag the data structure including these elements with topics related to the content, as part of an application program interface (API) call 320 to the messaging server.

The messaging server may provide a bot that interacts with content providers through the API to generate messages for subscribing users including the content. Upon receiving the API call, the bot may provide the access control for the content to a natural language processor, and instruct the natural language processor to analyze the content to extract one or more topics of the content. The natural language processor may return a list of topics to the bot.

The bot may search a database or list of subscriptions for those users that have subscribed to the content provider and/or have subscribed to the topics associated with the content (e.g., the content-provider-provided topics or the natural-language-processor-provided topics). The result of the search may be a list of users to whom the content will be provided in message form.

The messaging server may immediately generate and transmit a message 322 including the content, or may hold the content, potentially to be aggregated with other content, for transmission as part of a content digest (or multi-content message). The message or digest 322 may include the headlines, summaries, and/or access controls for the content.

The client may receive the content as part of a message or digest 322. The user may interact with some or all of the content by interacting with the access control associated with the content. The client and/or access control may be configured to report to the messaging server when the user has interacted with the access control for the content. For example, the client may generate a control report 324 and transmit the control report to the messaging server.

Based on the topics that were associated with the content for which the control report 324 was generated, the messaging server may generate a list of new topics to which the user may wish to subscribe. Optionally, the messaging server may transmit a topics update request 326 to the content provider. The topics update request may indicate that a subscribing user has accessed the content, and may request a list of topics or related topics for which the content provider generally generates. In response, the content provider may transmit a list of topics 328 relating to the content for which the content provider is likely to generate content. The list of topics 328 may be cross-checked against the messaging-server-generated list of topics for the content. This may serve to prevent, for example, the messaging server from generating a list of topics from the content that the content provider is unlikely to ever generate content for (which may result in a meaningless topic subscription).

Based on the topics generated from the content and/or provided by the content provider, the messaging server may generate a topics update message 330 and transmit the topics update message 330 to the client. The topics update message may include topics to which the user is not currently subscribed, but to which the user may be interested in subscribing based on their interaction with the new content and/or social networking interests. In response to the topics update message 330, the user may select zero or more new topics, and the client may transmit the selected topics 332 (if any) back to the messaging server. In response, the messaging server may update the user's subscription with the newly-identified topics.

Figure 4A:
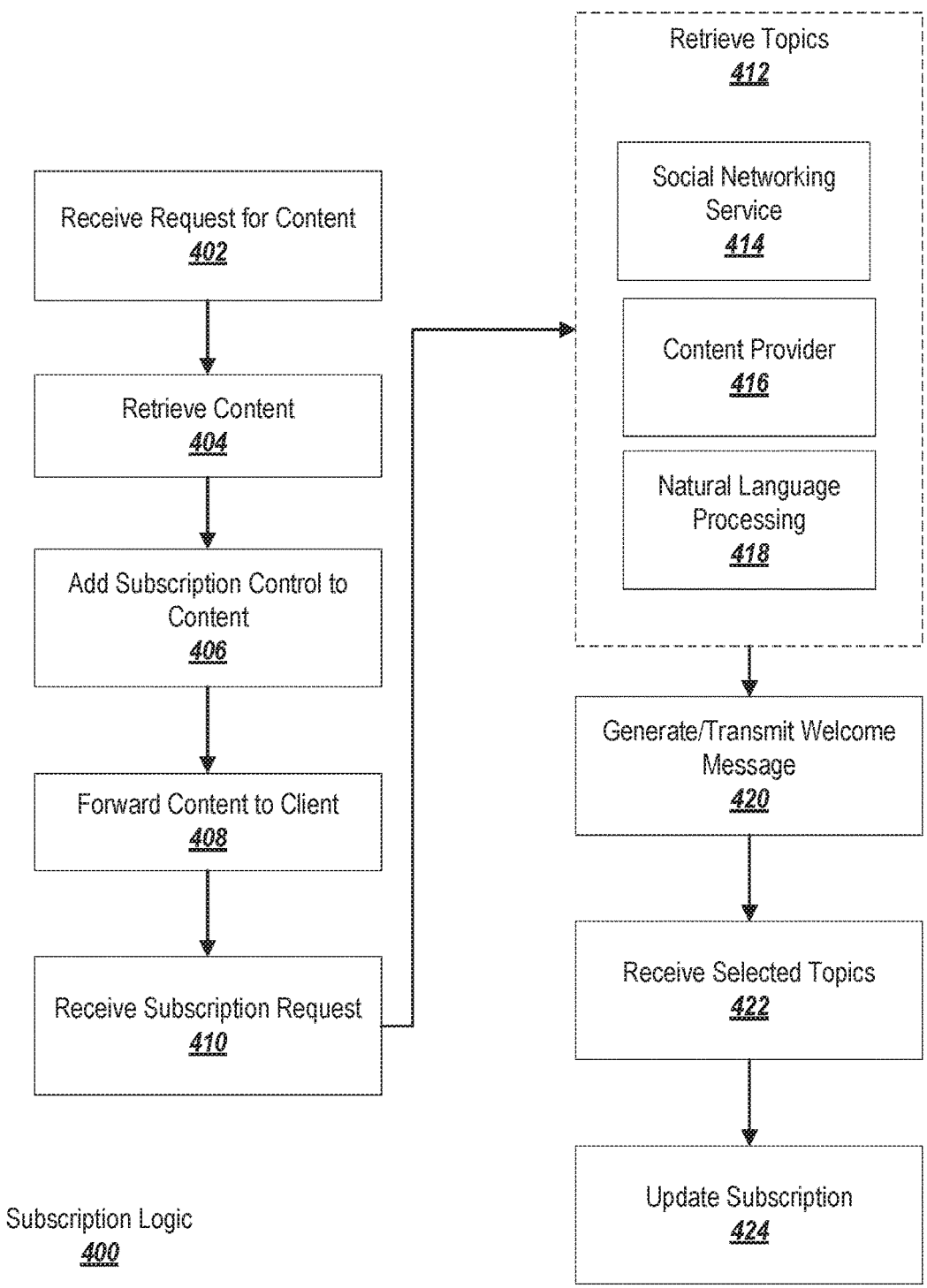
FIG. 4A is a flowchart describing exemplary logic for managing topic subscriptions in a messaging service.

FIG. 4A is a flowchart describing exemplary logic 400 for creating and managing subscriptions in more detail. The logic 400 may be executed by a system such as a messaging server, a social networking server, a third-party server, a client device, various combinations of these devices, etc.

At block 402, the system may receive a request for content. The request may be received from a client device associated with a user having a user account with a social networking service and/or a messaging service. The social networking service may be associated with the messaging service. The request may be a request for content provided by a content provider, such as a publisher, a news source, a weather information source, etc. The request may be received through a social networking interface, such as through a social networking news feed associated with the user account. The request may be received through a platform, such as a web site or app associated with the content provider or a third party.

At block 404, the system may retrieve the content in response to the request. If the content is stored locally at the system, the system may retrieve the content from local memory. If the content is not stored locally, the system may generate a network request to retrieve the content from a remote location, such as a server associated with the content provider.

At block 406, the system may add an interactive subscription control, such as a banner, to the content. The subscription control may indicate that the content, and/or related content, may be accessible through the messaging service. Interacting with the subscription control may signal a user's intent to subscribe to content provided by the content provider, content having similar subject matter to the requested content, or both, and to receive messages related to the subscription through the messaging service. At block 408, the system may forward the content (with the appended subscription control) to the client device.

At block 410, the system may receive a subscription request resulting from the user interacting with the subscription control. The subscription request may identify the user account requesting the subscription, conditions on the subscription (e.g., the user wishes to receive content from the content provider, content of similar subject matter, content from the content provider having similar subject matter, etc.), an identifier of the content that triggered the subscription request, the content provider of the content, etc.

At block 412, the system may identify one or more topics associated with the content, the content provider, and/or the user. The system may consult one or more sources to identify the topics at block 412. For example, the system may submit a request to a social networking service 414 for interests associated with the user account. The social networking service may search a social graph associated with the user account to identify nodes associated with the user's interests, and may report back with the nodes having the highest ratings or scores.

The system may also or alternatively consult the content provider 416. The system may query the content provider for topics on which the content provider regularly provides content, and or for topics relating to the original content retrieved at block 404 (if available).

The system may also or alternatively request that a natural language processor 418 perform natural language processing on the content retrieved at block 404. The natural language processor 418 may analyze the content to identify one or more topics, keywords, subjects, etc. associated with the content.

Based on the topics identified at block 412, the system may generate a list of topics to be suggested to the user. The list of topics may include the topics addressed by the content retrieved in block 404, optionally cross-checked against the interests of the user (as retrieved through the social networking service). Alternatively or in addition, the list of topics may include the topics regularly addressed by the content provider, also optionally cross-checked against the user's interests.

At block 420, the system may generate a welcome message that includes the list of topics identified in block 412. The welcome message may include a statement indicating that the user has subscribed to receive content (e.g., from the content provider), and may provide an opportunity to opt-out or unsubscribe from the subscription. The welcome message may include a list of suggested topics and interactive elements allowing the user to select zero or more topics of interest. The welcome message may include information provided by the content provider or may be formatted according to a template provided from the content provider to the messaging service.

The system may transmit the welcome message to a client device associated with the user's account. If the user has previously interacted with the content provider, then the messaging system may retrieve a thread identifier associated with the conversation between the user and the content provider. The welcome message may be associated with the thread identifier and may be transmitted on the same communication thread as was previously used for communication between the user and the content provider. If the user has not previously interacted with the content provider, then a new thread identifier may be generated and the welcome message may be transmitted on a new message thread between the user and the content provider.

At block 422, the system may receive a list of selected topics from the user. The list of selected topics may include zero topics, in which case the user may be subscribed to receive all content from the content provider, default content from the content provider, provider-selected content, messaging-service-selected content from the provider (e.g., selected based on the user's interests and natural language processing of the content), etc. The list may alternatively include one or more topics, in which case the list of topics may be associated with the user's subscription at block 424.

If the user was not previously associated with any subscriptions, then at block 424 a new subscription may be created for the user. The subscription may be registered as a data structure, such as an entry in a database or list. The data structure may be indexed based on the user's identifier, topics of interest, etc. If the user previously had a subscription, then the topics may be added to an entry associated with the user's subscription, or the user's identifier may be added to an entry associated with a particular topic.

Figure 4B:
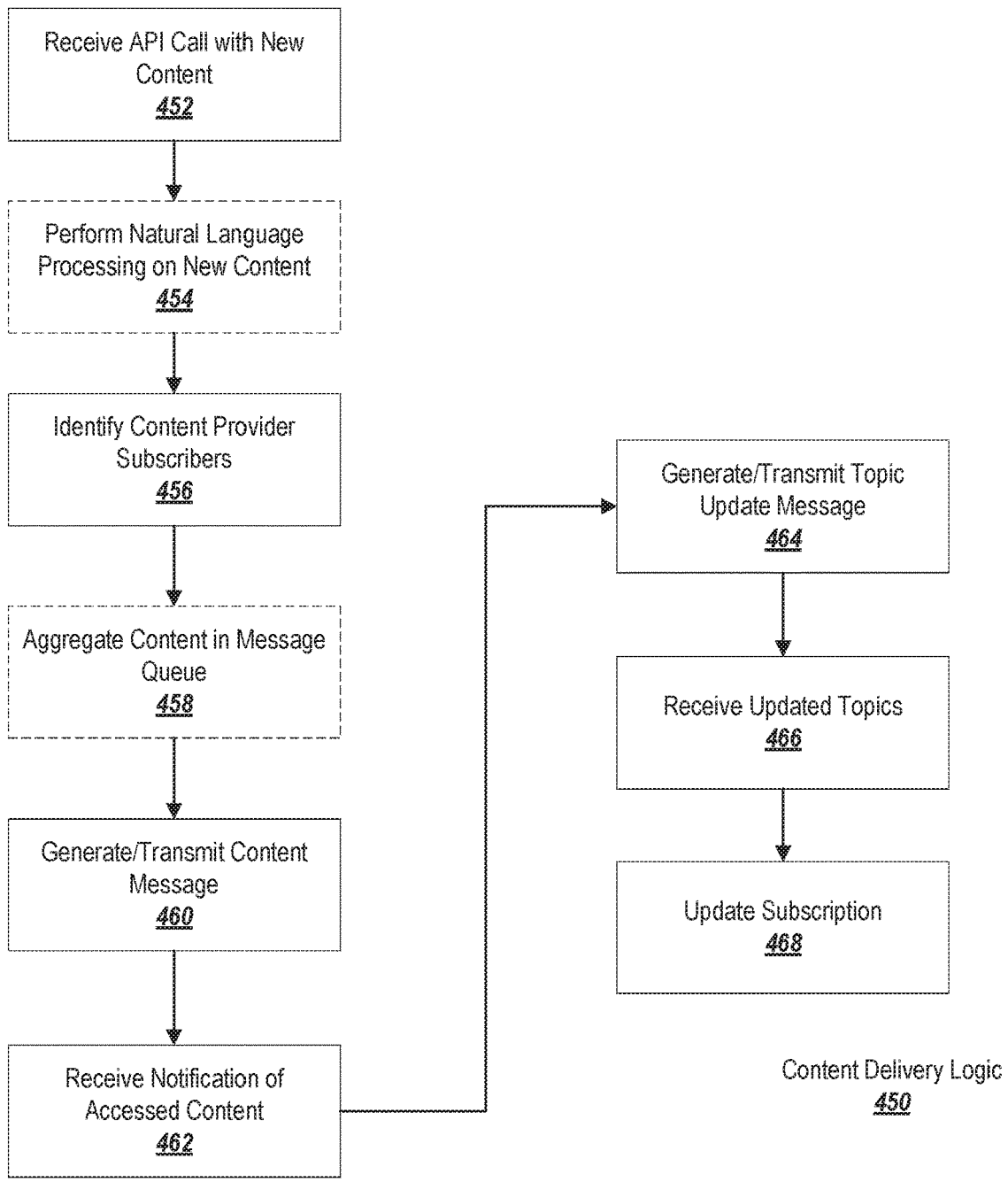
FIG. 4B is a flowchart describing exemplary logic for delivering content to subscribers in a messaging service.

FIG. 4B is a flowchart describing exemplary logic 450 for delivering content in accordance with a subscription in more detail. The logic 450 may be executed by a system such as a messaging server, a social networking server, a third-party server, a client device, etc.

At block 452, the system may receive an application program interface (API) call that includes new content or an access control (e.g., a hyperlink or other form of link) for the content. The API call may optionally identify one or more topics associated with the content. The API call may optionally identify one or more content providers associated with the content (alternatively, in some embodiments the content provider may be inferred based on the origin of the API call, such as a server associated with the content provider). The API call may identify a headline and/or summary of the content.

The API call may be received by a bot associated with the system. The bot may be configured to accept and parse the API calls and generate a message to be sent to subscribers based on the content associated with the API call.

In order to identify which subscribers should receive the content, the system may optionally, at block 454, perform natural language processing on the content. The bot may submit the content or access control to a natural language processor, which may analyze the content and extract one or more topics, keywords, or subjects from the content.

At block 454, the system may identify one or more subscribers to receive the content. The system may search a subscription data structure (e.g., database, list, etc.) for users that subscribe to the content provider associated with the API call. This list of users may optionally be filtered to remove users not interested in the content topics identified at blocks 452 and 454.

In another embodiment, some subscribers may request content on a particular topic, regardless of the content provider that originated the content. In this case, the database may be searched based on the identified topics of the content.

At block 458, the system may optionally aggregate the content in a message queue associated with a subscribing user. The system may wait to transmit accumulated messages once every predetermined time period (e.g., once per day, once per week, etc.). The system may wait to transmit accumulated messages until a predetermined number of messages have been accumulated. Alternatively, the system may maintain a constantly-updating digest on the client device, and may continually add new content to the digest (optionally notifying the user when new content is added).

At block 460, the system may generate a content message or digest. The system may utilize the headline and/or summary as part of the message. The message may include a link to the content (e.g., through the access control), or the message itself may be configured to be interactive or may include an interactive element that, upon selection, causes the access control to be engaged. Upon engaging the access element, the user may be presented with a copy of the content, e.g., through a web browser, social networking interface, content provider app, third party app, etc. The system may transmit the generated message to client devices associated with the subscribing user accounts identified at block 456.

At block 462, the system may receive a notification that some or all of the content from the message/digest has been accessed. In some embodiments, the access control may be configured to notify the system upon activation. In others, the client device may be configured to notify the system when activating the access control.

Based on the accessing of the content, at block 464 the system may attempt to identify further topics of interest to the user. For example, the system may check the topics identified at block 452 and/or 454 to determine whether any of the topics have not been presented to the user for consideration (or have not been presented for at least a predetermined amount of time). If so, the system may add the topics to a topic update message and may transmit the topic update message to the client. The topic update message may be similar to the welcome message described in connection with block 420 (FIG. 4A).

At block 466, the system may receive an updated list of topics in response to the topic update message, and may update the subscription with any newly-selected topics at block 468.

Although the above logic 400 and 450 has been described using particular examples of actions performed in a particular order, other combinations involving more or fewer actions, and/or actions performed in a different order, are also within the scope of the invention.

Messaging System Overview

Figure 5C:
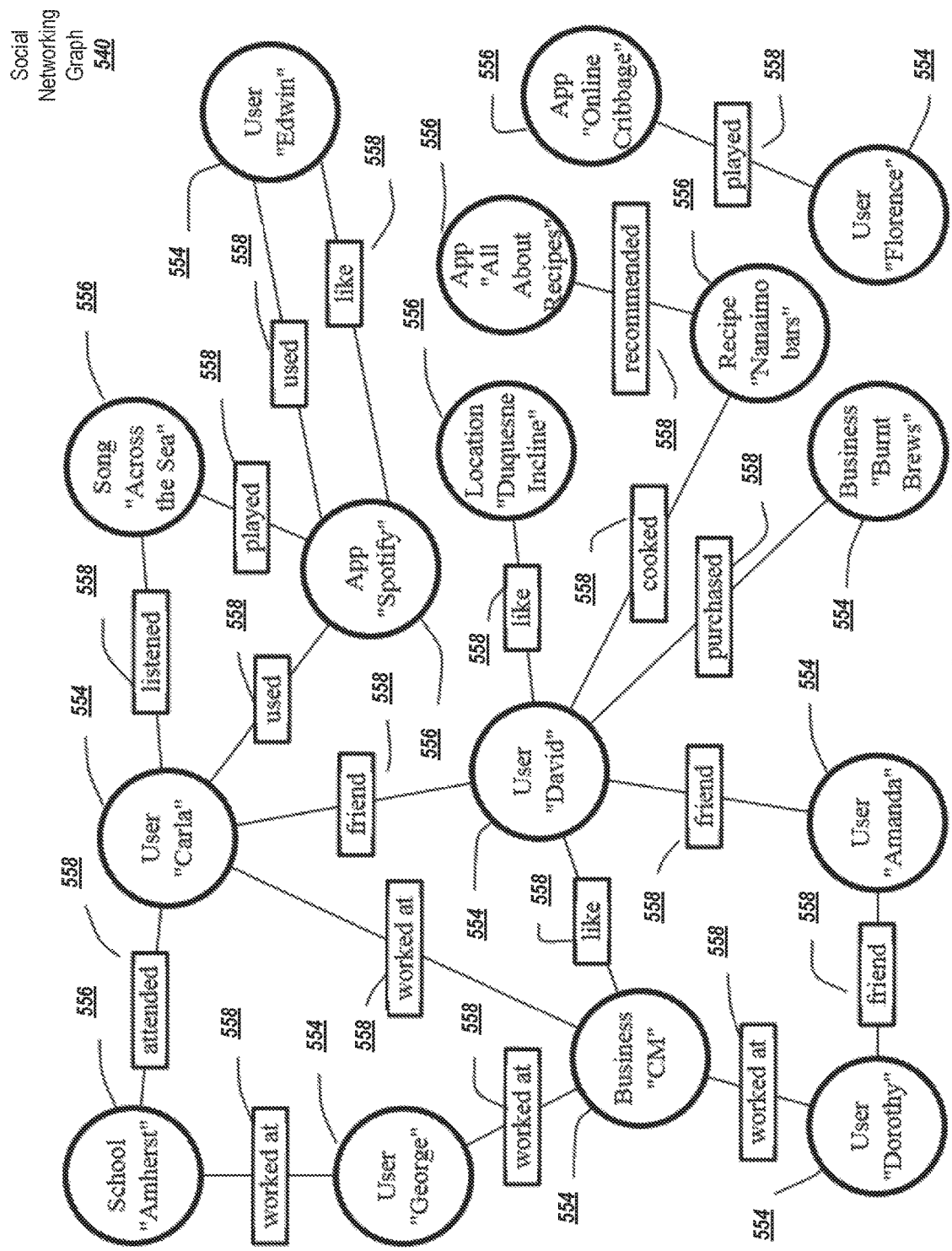
FIG. 5C depicts the social networking graph of FIGS. 5A-5B in more detail.

These examples may be implemented by a messaging system that is provided either locally, at a client device, or remotely (e.g., at a remote server). FIGS. 5A-5C depict various examples of messaging systems, and are discussed in more detail below.

FIG. 5A depicts an exemplary centralized messaging system 500, in which functionality for recognizing productive intent and generating a list of suggested recipients is integrated into a messaging server. The centralized system 500 may implement some or all of the structure and/or operations of a messaging service in a single computing entity, such as entirely within a single centralized server device 526.

The messaging system 500 may include a computer-implemented system having software applications that include one or more components. Although the messaging system 500 shown in FIG. 5A has a limited number of elements in a certain topology, the messaging system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the messaging system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the messaging system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and messaging logic 530. The messaging preferences 528 may include one or more privacy settings for one or more users and/or message threads. For example, the messaging preferences 528 may include a setting that indicates whether to create new conversations using a canonical or non-canonical implementation when pivoting from a one-on-one to a group conversation. Furthermore, the messaging preferences 528 may include one or more settings, including default settings, for the logic described herein.

The messaging logic 530 may include topic subscription logic 532 that is operable to create and manage user subscriptions to content providers and/or topics. The messaging logic 530 may further include content delivery logic 534 that is operable to deliver content in accordance with the subscriptions.

In some embodiments, messages may be sent peer-to-peer between users without the use of intervening server devices such as may implement the messaging service 500. In these embodiments, the messaging logic 530, including the topic subscription logic 532 and the content delivery logic 534, may reside on the client devices 510.

The network interface 522 of the client 510 and/or the messaging server 526 may also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the topic subscription logic 532 and/or content delivery logic 534) are incorporated into the messaging server 526. In contrast, FIG. 5B depicts an exemplary distributed messaging system 550, in which functionality for creating and managing subscriptions and handling content delivery is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate subscription server 552, which hosts the topic subscription logic 532 and the content delivery logic 534. The subscription server 552 may be distinct from the messaging server 526 but may communicate with the messaging server 526, either directly or through the network 524, to provide the functionality of the topic subscription logic 532 and the content delivery logic 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate subscription server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
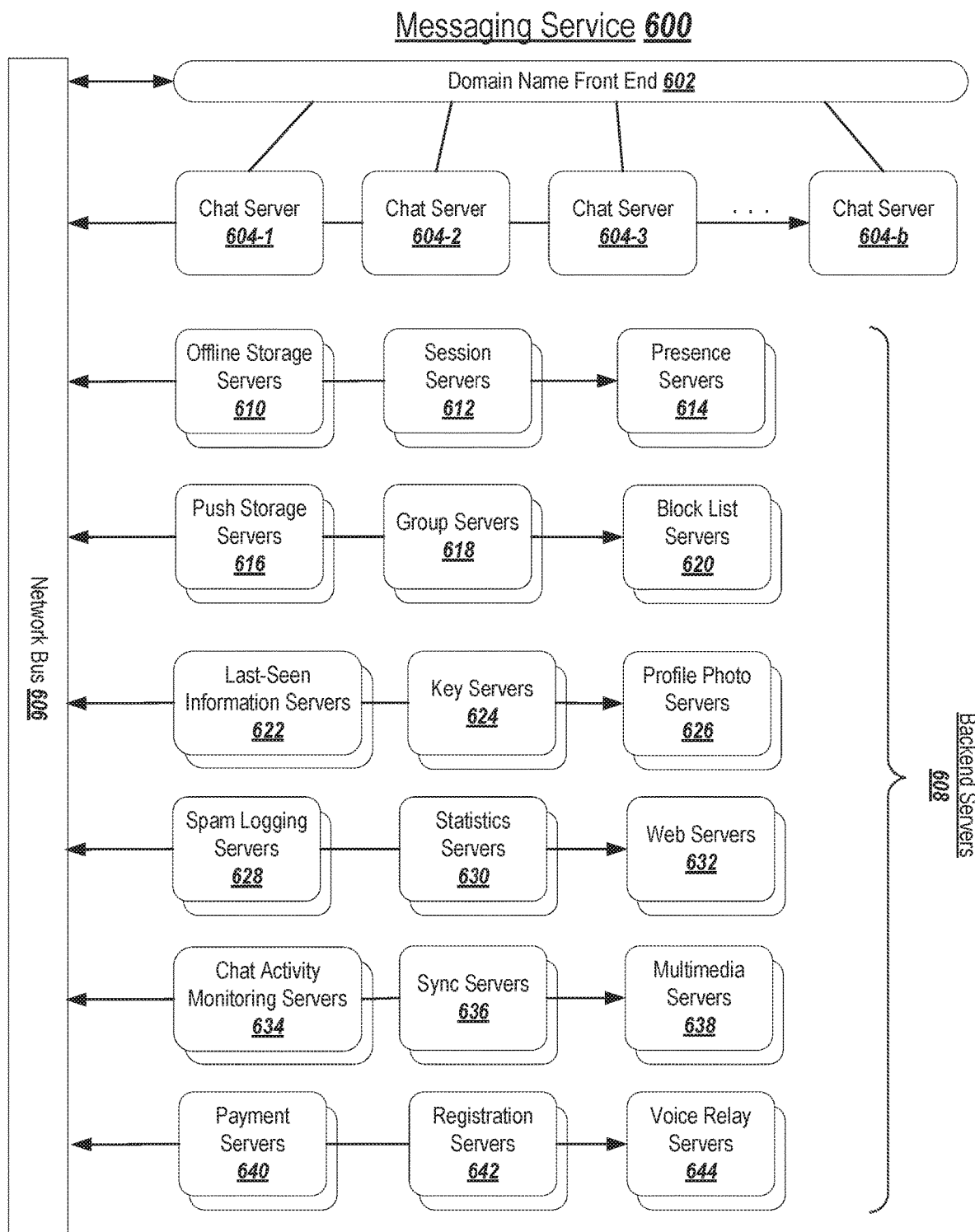
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
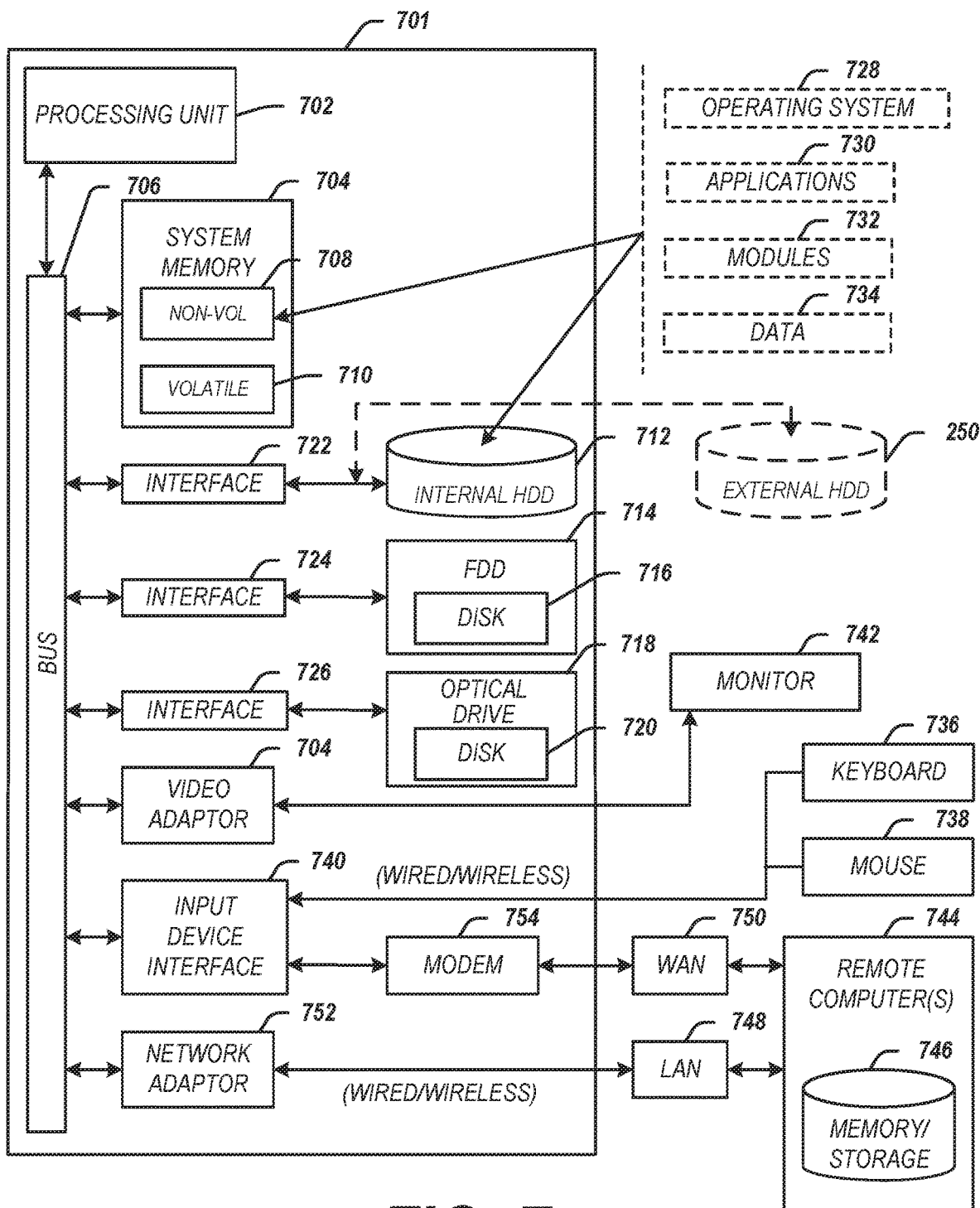
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
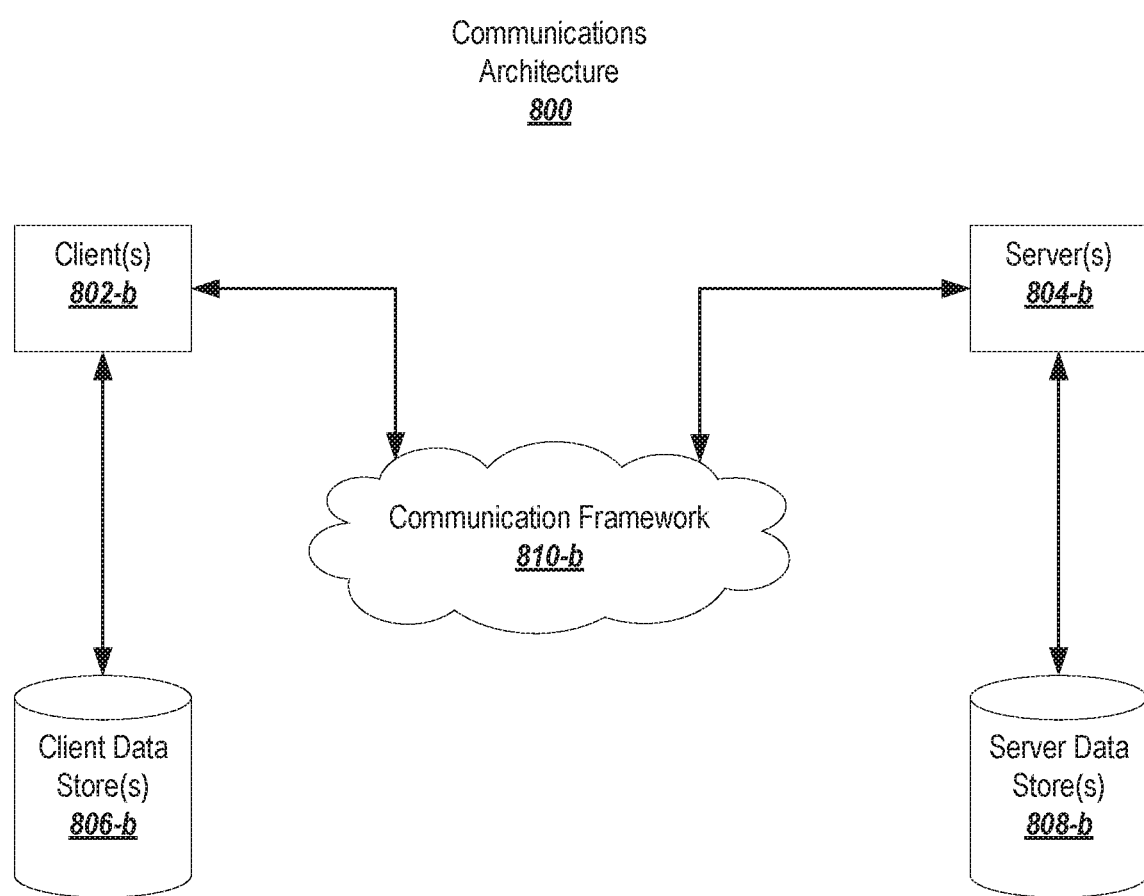
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
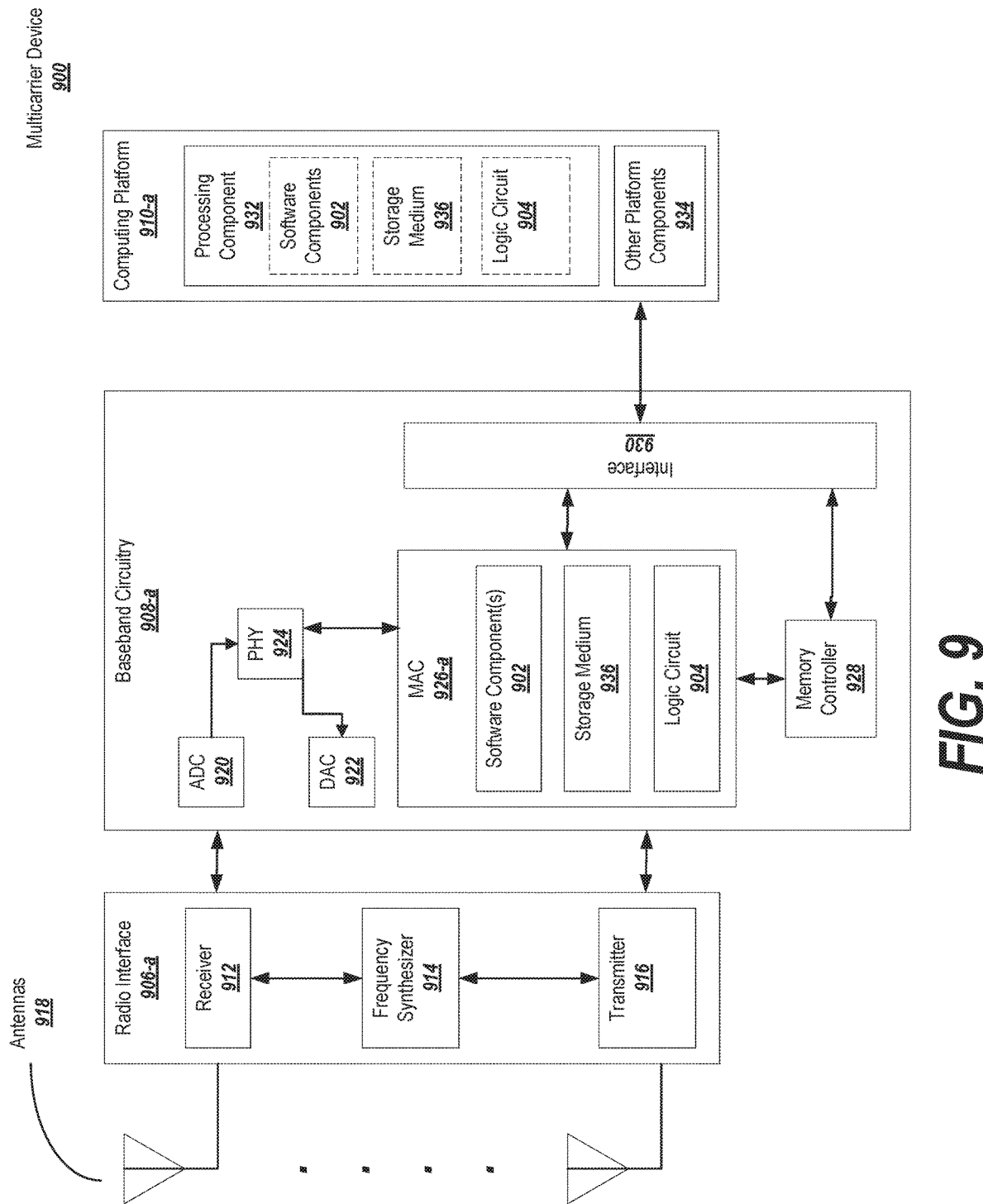
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-toanalog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
   presenting, in a user interface of a messaging application on a client device, a news feed displaying a summary of a content item and a user control;
   receiving activation of the user control;
   launching a web-based interface on the client device, the web-based interface displaying the content item and a related-content control;
   displaying a banner in the web-based interface in association with the content item, the banner indicating that the content item could have been received as part of a messaging-based subscription and received in the messaging application;
   receiving activation of the related-content control, the activation comprising a request for creation of a subscription with a content provider of the content item; and
   receiving additional content items from the content provider via the messaging application.

2. The method of claim 1 further comprising:
   displaying a banner in the web-based interface in association with the content item, the banner indicating that other content items related to the content item may be received as part of a messaging-based subscription and received in the messaging application.

3. The method of claim 1 further comprising:
   receiving a welcome message from the content provider, the welcome message comprising a list of topics identified as being of potential interest to a user of the client device;
   receiving a user selection of one or more of the topics; and sending the selected topics to the content provider;
wherein the additional content items are related to the selected topics.

4. The method of claim 3 further comprising:
receiving a topic update message comprising a list of additional topics related to previously-selected content items;
receiving a user selection of one or more of the additional topics; and
sending the selected additional topics to the messaging service;
wherein the additional content items are related to the selected topics or the additional selected topics.

5. The method of claim 1, the additional content items received as a digest, further comprising:
displaying the digest in a user interface of the messaging application as one or more selectable links, each selectable link associated with an additional content item;
receiving a user selection of one of the one or more selectable links;
requesting an additional content item associated with the selected link from the messaging service; and
receiving the additional content item.

6. The method of claim 5, the one or more selectable links displayed in the user interface in a module, further comprising:
receiving a horizontal scroll gesture in the module; and
scrolling the one or more selectable links in the direction of the horizontal scroll gesture.

7. A non-transitory, computer-readable medium storing instructions configured to cause a processor to:
present, in a user interface of a messaging application on a client device, a news feed displaying a summary of a content item and a user control;
receive activation of the user control;
launch a web-based interface on the client device, the web-based interface displaying the content item and a related-content control;
display a banner in the web-based interface in association with the content item, the banner indicating that other content items related to the content item may be received as part of a messaging-based subscription and received in the messaging application;
receive activation of the related-content control, the activation comprising a request for creation of a subscription with a content provider of the content item; and
receive additional content items from the content provider via the messaging application.

8. The medium of claim 7, the instructions further configured to cause the processor to:
display a banner in the web-based interface in association with the content item, the banner indicating that the content item could have been received as part of a messaging-based subscription and received in the messaging application.

9. The medium of claim 7, the instructions further configured to cause the processor to:
receive a welcome message from the content provider, the welcome message comprising a list of topics identified as being of potential interest to a user of the client device;
receive a user selection of one or more of the topics; and
send the selected topics to the content provider;
wherein the additional content items are related to the selected topics.

10. The medium of claim 9, the instructions further configured to cause the processor to:

receive a topic update message comprising a list of additional topics related to previously-selected content items;
receive a user selection of one or more of the additional topics; and
send the selected additional topics to the messaging service;
wherein the additional content items are related to the selected topics or the additional selected topics.

11. The medium of claim 7, the additional content items received as a digest, the instructions further configured to cause the processor to:
display the digest in a user interface of the messaging application as one or more selectable links, each selectable link associated with an additional content item;
receive a user selection of one of the one or more selectable links;
request the additional content item associated with the selected link from the messaging service; and
receive the additional content item.

12. The medium of claim 11, the selectable links displayed in the user interface in a module, the instructions further configured to cause the processor to:
receive a horizontal scroll gesture in the module; and
scroll the selectable links in the direction of the horizontal scroll gesture.

13. The medium of claim 11, the selectable links displayed in the user interface in a module, the instructions further configured to cause the processor to:
receive a horizontal scroll gesture in the module; and
scroll the selectable links in the direction of the horizontal scroll gesture.

14. An apparatus comprising:
a processor; and
a non-transitory, computer readable medium configured to store instructions for execution by the processor, the instructions configured to cause the processor to:
present, in a user interface of a messaging application on a client device, a news feed displaying a summary of a content item and a user control;
receive activation of the user control;
launch a web-based interface on the client device, the web-based interface displaying the content item and a related-content control;
receive activation of the related-content control, the activation comprising a request for creation of a subscription with a content provider of the content item; and
receive additional content items as a digest from the content provider via the messaging application;
display the digest in a user interface of the messaging application as one or more selectable links, each selectable link associated with an additional content item;
receive a user selection of one of the one or more selectable links;
request the selected additional content item associated with the selected link from the messaging service; and
receive the selected additional content item.

15. The apparatus of claim 14, the instructions further configured to cause the processor to:
display a banner in the web-based interface in association with the content item, the banner indicating that the content item could have been received as part of a messaging-based subscription and received in the messaging application or indicating that other content items related to the content item may be received as part of a messaging-based subscription and received in the messaging application.

16. The apparatus of claim 14, the instructions further configured to cause the processor to:
- receive a welcome message from the content provider, the welcome message comprising a list of topics identified as being of potential interest to a user of the client device;
- receive a user selection of one or more of the topics; and
- send the selected topics to the content provider;

wherein the additional content items are related to the selected topics.

17. The apparatus of claim 16, the instructions further configured to cause the processor to:
- receive a topic update message comprising a list of additional topics related to previously-selected content items;
- receive a user selection of one or more of the additional topics; and
- send the selected additional topics to the messaging service;

wherein the additional content items are related to the selected topics or the additional selected topics.

\* \* \* \* \*